(12) United States Patent
Vugts et al.

(10) Patent No.: US 11,816,976 B2
(45) Date of Patent: Nov. 14, 2023

(54) HANDHELD PERSONAL CARE DEVICE WITH A LIGHT INDICATOR FOR INDICATING AN OPERATIONAL CONDITION

(71) Applicant: KONINKLIJKE PHILIPS N.V., Eindhoven (NL)

(72) Inventors: Marinus Arnoldus Martinus Vugts, Eindhoven (NL); Pascal Jean Henri Bloemen, Eindhoven (NL); Marcus Franciscus Eijkelkamp, Eindhoven (NL); Willem Joosten, Eindhoven (NL); Hendrik Klaas Paauw, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 80 days.

(21) Appl. No.: 17/299,084

(22) PCT Filed: Aug. 19, 2020

(86) PCT No.: PCT/EP2020/073172
§ 371 (c)(1),
(2) Date: Jun. 2, 2021

(87) PCT Pub. No.: WO2021/032772
PCT Pub. Date: Feb. 25, 2021

(65) Prior Publication Data
US 2022/0189260 A1    Jun. 16, 2022

(30) Foreign Application Priority Data
Aug. 20, 2019 (EP) .................................... 19192514

(51) Int. Cl.
*G08B 5/36* (2006.01)
*B26B 19/38* (2006.01)
(Continued)

(52) U.S. Cl.
CPC .............. *G08B 5/36* (2013.01); *B26B 19/388* (2013.01); *G02B 6/0068* (2013.01); *B26B 19/14* (2013.01)

(58) Field of Classification Search
CPC ..... B26B 19/388; B26B 19/14; G02B 6/0068; G08B 5/36
See application file for complete search history.

(56) References Cited

U.S. PATENT DOCUMENTS 6,290,496 B1 *   9/2001   Azar ..................... A46B 15/003
                                                          433/29
11,389,980 B1 *  7/2022   VonDahlen ......... B26B 21/4087
(Continued)

FOREIGN PATENT DOCUMENTS

CN    105666532 A    6/2016
CN    205466348 U    8/2016
(Continued)

OTHER PUBLICATIONS

International Search Report and Written Opinion dated Nov. 17, 2020 For International Application No. PCT/EP2020/073172 Filed Aug. 19, 2020.

*Primary Examiner* — Hoi C Lau

(57) ABSTRACT

A hand held personal care device 1 has a main housing 2 arranged to be held by hand, and an operative unit 3 connected to the main FIG. 1 housing 2 and adapted for carrying out a personal care operation to a body part of a user. The main housing 2 has a main axis of extension 36 and accommodates a light indicator 4 for indicating an operational condition of the personal care device 1. The light indicator 4 has a light emitting surface 6, that extends circumferentially around the main housing 2 as a closed-loop surface about the main axis of extension 36, and a light guiding wall 31 of which at least a portion, including the
(Continued)

closed-loop surface, extends as a closed-loop wall portion 40 about the main axis of extension.

13 Claims, 5 Drawing Sheets

(51) Int. Cl.
*F21V 8/00* (2006.01)
*B26B 19/14* (2006.01)

(56) References Cited

U.S. PATENT DOCUMENTS

| | | | |
|---|---|---|---|
| 2011/0016772 A1 | 1/2011 | Talwar | |
| 2011/0296643 A1* | 12/2011 | Shepherd | A61N 5/0603 |
| | | | 15/167.1 |
| 2012/0198640 A1* | 8/2012 | Jungnickel | A46B 15/0012 |
| | | | 15/105 |
| 2013/0000059 A1* | 1/2013 | Jungnickel | A46B 15/0044 |
| | | | 15/22.1 |
| 2017/0127815 A1* | 5/2017 | Renfro | A46B 17/08 |
| 2019/0061183 A1* | 2/2019 | Neyer | B26B 19/388 |
| 2019/0299466 A1* | 10/2019 | Goeder | B26B 21/48 |
| 2021/0145539 A1* | 5/2021 | Greve | A61H 37/00 |
| 2021/0315368 A1* | 10/2021 | Jungnickel | A46B 15/0012 |
| 2021/0315369 A1* | 10/2021 | Jungnickel | A61C 17/3481 |
| 2021/0315370 A1* | 10/2021 | Jungnickel | A46B 15/0044 |
| 2021/0315675 A1* | 10/2021 | Jungnickel | A61C 17/225 |
| 2022/0189260 A1* | 6/2022 | Vugts | B26B 21/4056 |
| 2022/0307681 A1* | 9/2022 | Vugts | B26B 19/388 |

FOREIGN PATENT DOCUMENTS

| | | |
|---|---|---|
| DE | 7223118 U | 12/1972 |
| DE | 9402875 U1 | 4/1994 |
| DE | 29611519 U1 | 9/1996 |
| EP | 3372357 A1 | 9/2018 |
| GB | 599290 A | 3/1948 |
| JP | 2001-311633 A | 11/2001 |
| JP | 2013-152125 A | 8/2013 |
| WO | 2014/191184 A1 | 12/2014 |
| WO | 2018/100155 A1 | 6/2018 |

* cited by examiner

HANDHELD PERSONAL CARE DEVICE WITH A LIGHT INDICATOR FOR INDICATING AN OPERATIONAL CONDITION

CROSS REFERENCE TO RELATED APPLICATIONS

This application is the U.S. National Phase application under 35 U.S.C. § 371 of International Application No. PCT/EP2020/073172 filed Aug. 19, 2020, which claims the benefit of European Patent Application Number 19192514.8 filed Aug. 20, 2019. These applications are hereby incorporated by reference herein.

FIELD AND BACKGROUND OF THE INVENTION

The present invention relates to a handheld personal care device according to the introductory portion of claim 1.

WO 2018/100155 A1 discloses a shaving device having a light indicator to visualize the progress of a shaving operation by changing a number of light sources that is active as less hair-cutting action is detected, which indicates progress of the shaving operation. Alternatively, one or more light sources of a first color may fade out while one or more light sources of a second color fades in as progress of the shaving operation is detected. The light indicator can for instance be formed as a rectangular light emitting surface or as a partial, preferably C-shaped ring that partially surrounds the upper end of the shaver in the proximity of the cutting element, so that the user will also see the light indicator when looking at the cutting element to see where the shaving operation is applied. By using a partial ring, in particular a C-shaped ring, the light indicator can form part of one shell of the casing, in particular when the casing is basically composed of two shells of similar size, in particular two half shells.

From US 2011/00167721A1, a handheld personal care device in the form of a wet shaving system is shown in which a light guide of a button assembly receives light from a light source and emits light in the form of an illuminated symbol.

EP 3 372 357 A1 discloses a handheld personal care device comprising one or more light emitting elements and one or more light receiving elements arranged to receive, via a mirror in an environment of a user, light emitted by the light emitting elements depending on the position and/or the orientation of the device relative to the user. The device further has a control unit configured to estimate the position and/or the orientation of the device based on measurement of the light received by the light receiving elements. The light emitting elements and/or the light receiving elements may be arranged in a circular pattern circumferentially around the housing of the device.

SUMMARY OF THE INVENTION

It is an object of the present invention to provide a handheld personal care device in which a light indicator is more easily and more continuously visible during use, and in which the light indicator can be accommodated in a compact device while obtaining a particularly uniform distribution of light intensity in circumferential sense over the light emitting surface with a limited number of light sources.

According to the present invention, this object is achieved by providing a handheld personal care device according to claim 1.

Because the light emitting surface extends circumferentially around the main housing as a closed-loop surface about the main axis of extension, the light indicator can be seen from virtually all sides of the device, so the light indicator will typically remain visible (directly or via a mirror used to visually monitor the operation being applied) regardless of the orientation in which the device is held. In particular when the indicator is used for indicating a rapidly changing operational condition, such as shaving pressure, encountered resistance, exerted driving torque, speed of rotation or temperature of expelled air, it is important that an indication of a change of the operational condition out of or into a preferred operating range is immediately noticed, so that the user can immediately act to cause the condition to return to a preferred range.

For accommodating the light indicator in a compact device while obtaining a particularly uniform distribution of light intensity in circumferential sense over the light emitting surface with a limited number of light sources, the invention provides that:

the light indicator further includes an optically transparent light guide and at least one light source;

the light emitting surface is a closed-loop surface of the light guide which faces in a direction having a main component in an outward radial direction relative to the main axis of extension;

the light guide has a light receiving surface arranged in an average axial position relative to the main axis of extension further away from the operative unit than an average axial position of the light emitting surface, and facing in a direction having a main component in an axial direction relative to the main axis of extension away from the operative unit;

the at least one light source is arranged, in the axial direction, in a position adjacent to the light receiving surface such that, during operation, light generated by the light source is received by the light receiving surface;

the light guide has a light guiding wall extending from the light receiving surface to the light emitting surface, wherein at least a portion of the light guiding wall including the closed-loop surface of the light guide extends as a closed-loop wall about the main axis of extension; and seen in cross-section including the main axis of extension, the light guiding wall is curved and gradually spreads out from an orientation with a main component parallel to the main axis of extension at the light receiving surface to an orientation with a main component perpendicular to the main axis of extension at the light emitting surface.

The invention and particular embodiments as well as further optional features and effects of the invention are set forth in the dependent claims and the description and appear from the drawings.

DETAILED DESCRIPTION OF THE EMBODIMENTS

Figure 1:
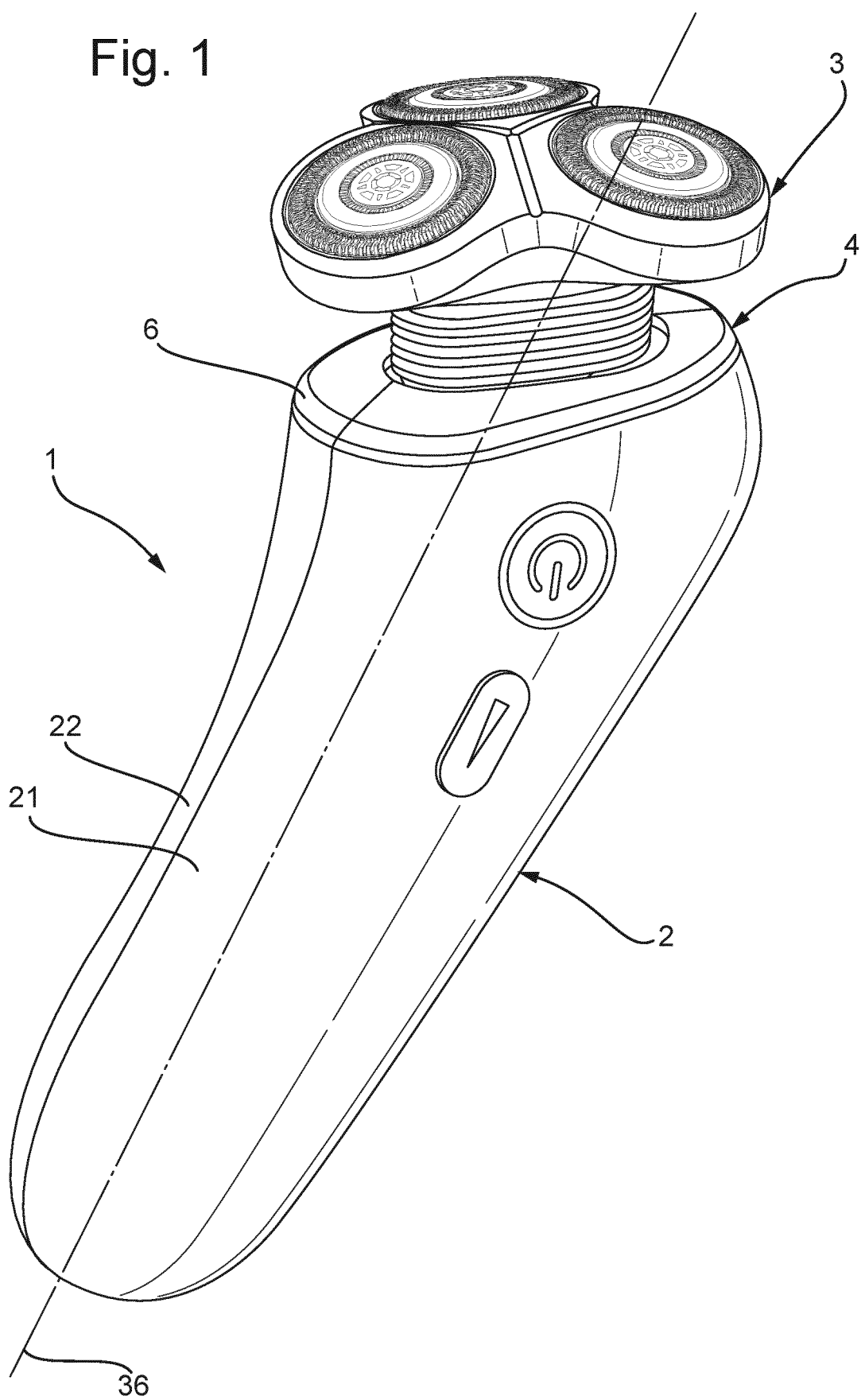
FIG. 1 is a perspective view of an example of a device according to the invention.

In the drawings, an example of a hand held personal care device 1 according to the invention is shown having a main housing 2 arranged to be held by hand and an operative unit 3 for carrying out a personal care operation to a body part of the user. In this example, the personal care device is an electric shaving device of which the operative unit is a shaving unit 3. However, the personal care device may also be a device with an operative unit for use in other personal care operations, such as an epilating head, a hot air outflow opening (e.g. for hair-drying), a heated hair clamp (e.g. for hair-curling or hair-straightening) or a temperature sensor (for measuring body temperature). The operative unit may be arranged mainly outside the main housing, as for instance in the present example, or be arranged partially, mainly or completely inside the main housing, for instance with an operative head, surface or opening flush with adjacent portions of the main housing.

Figure 2:
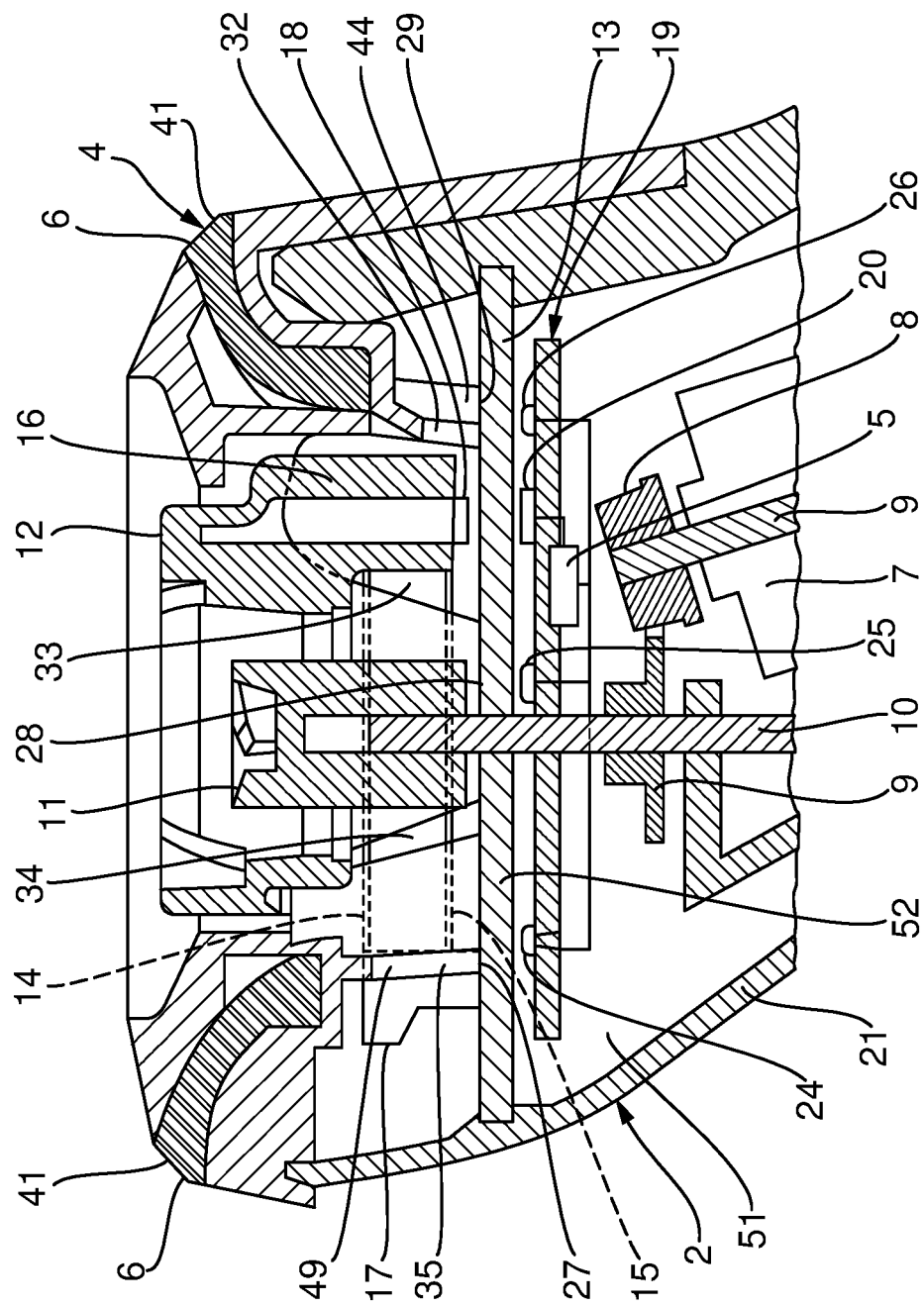
FIG. 2 is a cross-sectional view of a top portion of a main housing of the device according to FIG. 1.
Figure 3:
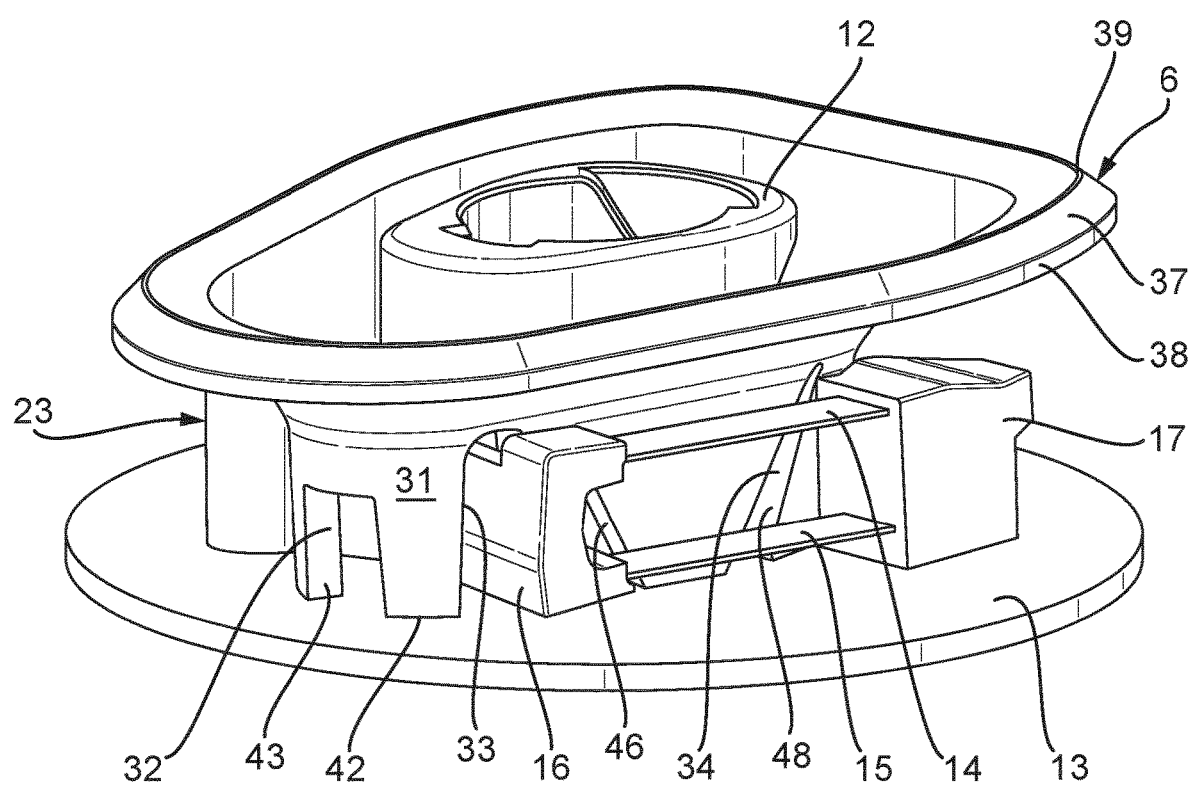
FIG. 3 is a perspective view of a light guide and a shaving unit carrier and a housing shield of the device according to FIGS. 1 and 2.
Figure 4:
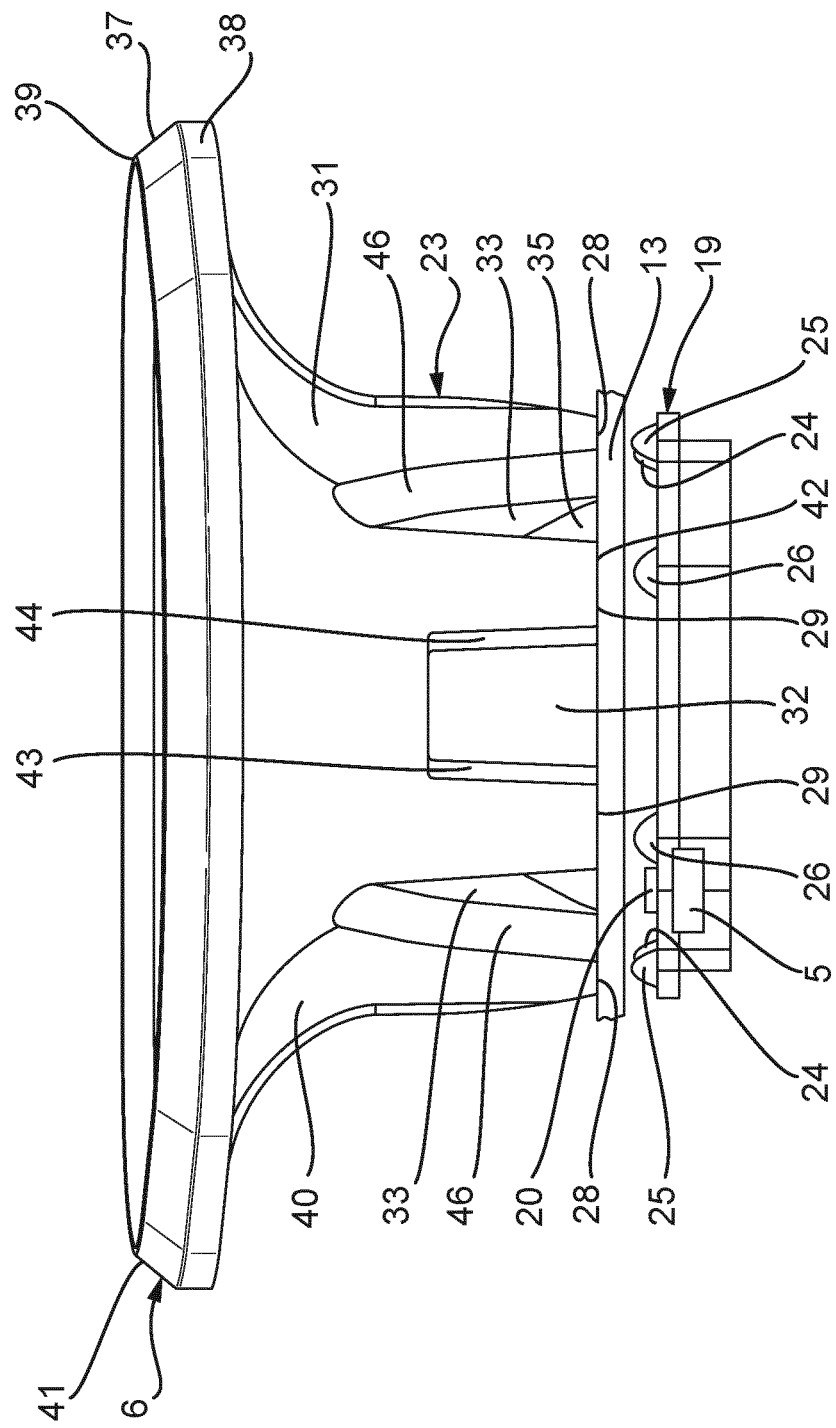
FIG. 4 is a frontal view of the light guide, a housing shield and a printed circuit board of the device according to FIGS. 1-3.
Figure 5:
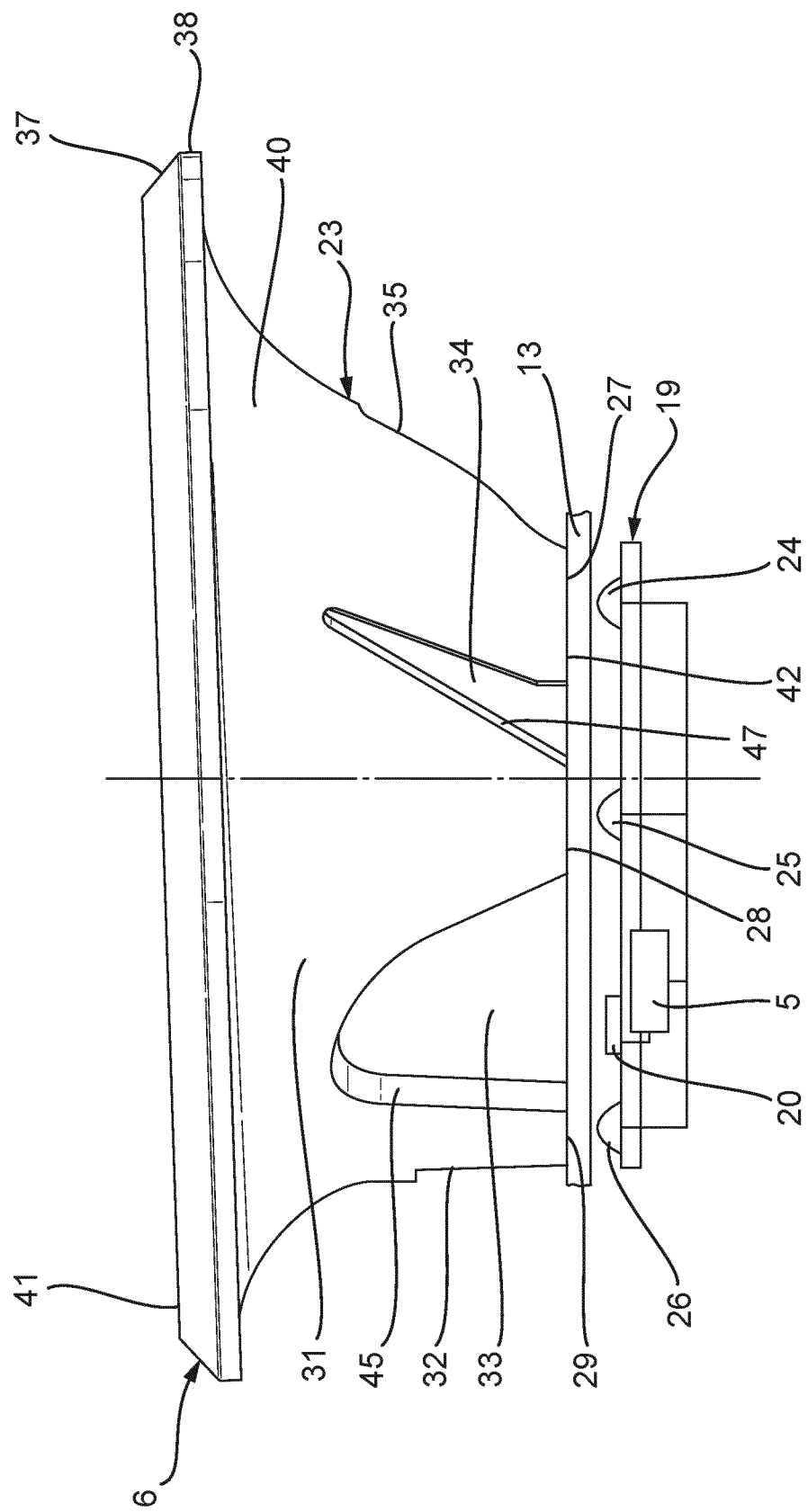
FIG. 5 is a side view of the light guide, the housing shield and the printed circuit board of the device according to FIGS. 1-4.

In this example, as is shown in FIGS. 2 and 3, a motor 7 is arranged in the main housing 2 and a driving gear wheel 8 is mounted to a motor output drive shaft 9 projecting from the motor 7. The driving gear wheel 8 engages a driven gear wheel 9 fixed to a central drive shaft 10. The central drive shaft 10 is rotatably suspended in the main housing 2. A driving coupling 11 is coupled to a free end of the central drive shaft 10 and arranged for driving engagement with a driven coupling (not shown) of the shaving unit 3. The shaving unit 3 is removably connectable to a shaving unit carrier 12. The shaving unit carrier 12 is suspended relative to a shield 13 via pairs of leaf springs 14, 15 on opposite sides of the shaving unit carrier 12 and connected to a carrier beam 16 of the shaving unit carrier 12. The shield 13 is fixed between shells 21, 22 of the main housing 2. Ends of the leaf springs 14, 15 opposite of the ends mounted to the carrier beam 16 are coupled to pedestals 17 on corresponding, mutually opposite sides of the shaving unit carrier 12. The pedestals 17 are fixed relative to the shield 13.

A magnet 18 is mounted to a bottom side of the shaving unit carrier 12. Closely below the shield 13, a printed circuit board (PCB) 19 is mounted carrying a Hall sensor 20 close to the magnet 18 and aligned with the magnet 18. The Hall sensor 20 is connected to a circuitry 5 which is also mounted to the PCB 19. Light sources 24, 25, 26 are also mounted to the PCB 19. The circuitry 5 is arranged for outputting a voltage for activating or deactivating the light sources 24-26 in response to a measured distance between the magnet 18 and the Hall sensor 20, which represents a shaving pressure exerted on the shaving unit 3. The light sources 24-26 are activated if a too high shaving pressure causes the shaving unit 3 to press the shaving unit carrier 12 further towards the shield 13 than if the shaving pressure would be within a preferred range or below a given threshold value. In response to such a too small measured distance between the magnet 18 and the Hall sensor 20, the circuitry could cause e.g. green light sources to be deactivated, and e.g. red light sources to be activated. An intermediate distance in which for instance orange or yellow light sources are activated and the other light sources are deactivated is also conceivable. It is also possible to use RGB LEDS so that the light sources can each be controlled to emit light of a particular color, e.g. blue for a too low shaving pressure, green for a shaving pressure within an advisable range and red for a too high shaving pressure.

The indication of the exerted shaving pressure occurs by a light indicator 4 accommodated in the main housing 2 of the device 1, of which light indicator 4 the light sources 24-26 are parts. Thus, the light indicator 4 is connected to be activated in accordance with exerted shaving pressure.

The light indicator 4 may alternatively or additionally be connected to circuitry for monitoring other operational conditions of the device, such as a sensing circuitry for indicating progress of a shaving operation, a circuitry for indicating battery charge status or a circuitry for indicating whether cleaning of the shaving unit is advisable.

The light indicator 4 has a light emitting surface 6 near the shaving unit 3, which light emitting surface 6 extends circumferentially around the main housing 2 as a closed-loop surface about a main axis of extension 36 of the main housing 2.

Because the light emitting surface 6 constitutes a closed loop surface extending circumferentially around the main housing 2 about the main axis of extension 36, the light indicator 4 can be seen from virtually all sides of the device 1, so the light indicator 4 will typically remain visible (directly or via a mirror used to visually monitor the operation being applied) regardless of the orientation in which the device 1 is held. In particular when the indicator 4 is used for indicating a rapidly changing condition, such as shaving pressure, encountered resistance, exerted driving torque, speed of rotation or temperature of expelled air, it is particularly advantageous if an indication of a change of condition out of or into a preferred range is immediately noticed, so that the user can immediately act to cause the condition to return to a preferred range.

For a particularly good visibility of the light emitting surface 6 of the light indicator 4 during use, it is advantageous if the light emitting surface 6 extends circumferentially around a first housing portion to which the shaving unit 3 is connected. The first housing portion thus is an upper portion of the main housing 2 located between the shaving unit 3 and a second housing portion of the main housing 2 that is located remotely from the shaving unit 3. Preferably, the first housing portion has an axial length along the main axis of extension 36 smaller than or equal to 50% of the total axial length of the main housing 2 along the main axis of extension 36, and more preferably smaller than or equal to 33% and yet more preferably 20% of this total axial length. Thus, the light emitting surface 6 of the light indicator 4 is preferably arranged in an upper portion of the main housing 2 near the shaving unit 3, which is typically the portion of the device 1 a user watches most during use, and a large amount of room is left to hold the main housing 2 by hand without obscuring the light indicator 4 from view.

The drive train formed by the central drive shaft 10 and the driving coupling member 11 which is coupled to the shaving unit 3, when the device 1 is in operative condition, extends through the closed-loop light emitting surface 6. Thus, the light emitting surface 6 of the light indicator 4 remains visible if the shaving device 1 is rotated with the shaving unit 3 remaining projecting from the main housing 2 in generally the same direction, as typically occurs during shaving. Also during use of devices for carrying out other personal care operations, the operative unit generally remains directed in roughly the same direction as the device is manipulated during use, while movement and rotation in planes generally perpendicular to that direction are typically of a much larger magnitude. Regardless of such movements, the closed-loop light emitting surface of the light indicator remains visible.

As is illustrated by FIG. 2, very little space is available in handheld personal care devices, which makes it difficult to realize the light emitting surface 6 such as to form a closed-loop surface circumferentially around the main housing 2 without adding a significant amount of volume to the main housing 2. Also the brightness of the light emitting surface 6 should preferably be substantially constant over the entire circumference, while in view of cost constraints the number of light sources should be limited. To meet these requirements, the light indicator 4 further includes an optically transparent light guide 23. The light emitting surface 6 is a closed-loop surface of the light guide 23 which faces in a direction having a main component in an outward radial direction relative to the main axis of extension 36. In this example, the light emitting surface 6 includes a central portion 37 oriented obliquely relative to the main axis of extension 36 about which the closed-loop light emitting surface 6 extends, an outer portion 38 facing mainly radially outward relative to the main axis of extension 36, and an inner portion 39 facing mainly axially relative to the main axis of extension 36. All these portions form closed-loop surfaces extending about the main axis of extension 36. The light guide 23 further has a light receiving surface comprising light receiving surface portions 27, 28 and 29 arranged in an average axial position relative to the main axis of extension 36 further away from the shaving unit 3 than an average axial position of the light emitting surface 6. The light receiving surface portions face in a direction having a main component in an axial direction relative to the main axis of extension 36 away from the shaving unit 3. The light sources 24-26 are, in the axial direction, each located in a position adjacent to a respective one of the light receiving surface portions 27-29 such that, during operation, light generated by the light sources 24-26 is received by the light receiving surface portions 27-29. The light guide 23 has a light guiding wall 31 extending from the light receiving surface portions 27-29 of the light receiving surface to the light emitting surface 6. A portion of the light guiding wall 31 including the closed-loop light emitting surface 6 of the light guide 23 extends as a closed-loop wall portion 40 about the main axis of extension 36. Seen in cross-section along a plane extending through the main axis of extension 36 (as e.g. in FIG. 2), the light guiding wall 31 is curved and gradually spreads out from an orientation with a main component about parallel to the main axis of extension 36 at the light receiving surface portions 27-29 of the light receiving surface to an orientation with a main component about perpendicular to the main axis of extension 36 at the light emitting surface 6.

Thus, the light sources 24-26 are located spaced from the light emitting surface 6, which leaves room for components that provide the personal care function of the device (in this example in particular the shaving unit carrier 12 with suspension 14-17 and the coupling 11) in the spatial area around which the closed loop wall portion 40 of the light guiding wall 31 extends. Furthermore, the curved light guiding wall 31 guides light from a primarily axial direction of propagation, relative to the main axis of extension 36, at the light receiving surface portions 27-29 towards a more radially outward direction of propagation, relative to the main axis of extension 36, at the light emitting surface 6. The curved light guiding wall 31 also spreads the light in circumferential direction over a substantial distance, so that a very uniform illumination of the light emitting surface 6 is achieved. The uniformity of the illumination of the light emitting surface 6 is further enhanced because the plurality of light sources 24-26 are arranged, in the axial direction, in uniformly distributed positions adjacent to the light receiving surface portions 27-29 of the light receiving surface.

For the purpose of a uniform light distribution along the light emitting surface 6 while leaving room for components that provide the personal care functionality of the device 1, it is also advantageous that the light guiding wall 31 of the light guide 23 is a tub-shaped wall. According to said tub-shape of the light guiding wall 31, the light emitting surface 6 extends along a first circumferential edge 41 of the tub-shaped wall at a side of the tub shaped wall facing the shaving unit 3, and the light receiving surface portions 27-29 of the light receiving surface extend along a second circumferential edge 42 of the tub-shaped wall at a side of the tub-shaped wall 31 remote from the shaving unit 3.

The uniformity of the illumination of the light emitting surface 6 is further enhanced by manufacturing said first circumferential edge 41 of the light guiding wall 31, including the light emitting surface 6, from an optically diffusive material. The optically diffusive material diffuses the light that enters the first circumferential edge 41, so that a more even distribution of the light along the circumference of the light emitting surface 6 is achieved. The remaining part of the light guiding wall 31 may be made from an optically transparent material having a relatively high optical transparency to optimize the light guiding properties of the light guiding wall 31. The light guiding wall 31 may be made from said two different materials by means of a 2K injection molding process.

In some embodiments, a single light source can be sufficient to achieve the desired degree of uniformity of the intensity of the illumination in circumferential direction along the light emitting surface, provided that the single light source is far enough away from the light emitting surface to achieve the desired uniformity of the circumferential distribution of light in the light guide with a suitable design of the light guide. However, for an illumination intensity that is uniform in circumferential direction along the light emitting surface, it is advantageous to provide a plurality of light sources, in particular if little space is available for the light guiding wall 31 in the direction of the main axis of extension 36. The light sources 24-26 are then preferably arranged in the axial direction adjacent to the light receiving surface and distributed along the light receiving surface.

For accommodating components that provide the personal care functionality of the device (in this example shaving), and in particular for allowing parts of such components to extend from a position inside of the light guide 23 to a position outside of the light guide 23, the light guiding wall 31 of the light guide 23 has indentations 32, 33 and 35. Indentations 34 are provided for further improving uniformity of emitted light intensity in circumferential direction of the light emitting surface 6. The indentations 32, 33, 34, 35 each form an interruption of the light receiving surface at positions in-between the light sources 24-26, and thus divide the light receiving surface into the light receiving surface portions 27-29. The indentations 32-35 each extend from the light receiving surface in a direction towards the light emitting surface 6.

As is best seen with reference to the indentations 33 and 34, the indentations 32-35 each have two opposite side walls 43-49 that gradually converge from the light receiving surface in the direction towards the light emitting surface 6. This is advantageous for a uniform distribution of light in circumferential direction towards the light emitting surface 6, in particular if, as in the present example, the indentations 32-35 and the light sources 24-26 are located and shaped such that each portion of the light receiving surface 6 is (also) directly irradiated by light from at least one of the light sources 24-26 guided by the light guiding wall 31.

The light sources 24-26 are arranged in a watertight chamber 51 of the main housing 2, while the light guide 23 is arranged outside this watertight chamber 51, separated from the light sources 24-26 and the watertight chamber 51 by a shield 13, which forms an optically transparent sealing member of the watertight chamber 51. Thus, the light sources 24-26 are very reliably shielded from water and other liquids as well as from shaving debris in a simple manner which does not require any sealing along the light guide 23. The shield 13 has an optically transparent wall 52. During use, light generated by the light sources 24-26 is transmitted to the light receiving surface portions 27-29 of the light guide 23 via the optically transparent wall 52.

The light guide 23 is arranged such that the light receiving surface portions 27-29 are in direct contact with the optically transparent wall 52 of the shield 13. This prevents shaving debris and other dust from entering between the light receiving surface portions 27-29 of the light guide 23 and the optically transparent wall 52 of the shield 13, so that the light path reliably remains open without requiring the light guide 23 to actually extend directly into the front of the light sources 24-26. Furthermore, the direct contact between the light receiving surface portions 27-29 and the optically transparent wall 52 of the shield 13 improves the optical coupling efficiency between the light sources 24-26 and the light guide 23.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A hand held personal care device having:
   a main housing arranged to be held by hand; and
   an operative unit connected to the main housing and adapted for carrying out a personal care operation to a body part of a user;
   wherein the main housing:
   has a main axis of extension; and
   accommodates a light indicator for indicating an operational condition of the personal care device, said light indicator having a light emitting surface extending circumferentially around the main housing as a closed-loop surface about the main axis of extension, the light indicator further including an optically transparent light guide and at least one light source;
   characterized in that:
   the light emitting surface of the light indicator is a closed-loop surface of the light guide which faces in a direction having a main component in an outward radial direction relative to the main axis of extension;
   the light guide has a light receiving surface arranged in an average axial position relative to the main axis of extension further away from the operative unit than an average axial position of the light emitting surface, and facing in a direction having a main component in an axial direction relative to the main axis of extension away from the operative unit;
   the at least one light source is arranged, in the axial direction, in a position adjacent to the light receiving surface such that, during operation, light generated by the light source is received by the light receiving surface;
   the light guide has a light guiding wall extending from the light receiving surface to the light emitting surface, wherein at least a portion of the light guiding wall including the closed-loop surface of the light guide extends as a closed-loop wall portion about the main axis of extension; and
   seen in cross-section comprising the main axis of extension, said light guiding wall is curved and gradually spreads out from an orientation with a main component parallel to the main axis of extension at the light receiving surface to an orientation with a main component perpendicular to the main axis of extension at the light emitting surface.

2. The device according to claim 1, wherein the main housing has a total axial length along the main axis of extension, and comprises a first housing portion to which the operative unit is connected and a second housing portion remotely arranged from the operative unit, wherein the light emitting surface extends circumferentially around the first housing portion, and wherein the first housing portion has an axial length along the main axis of extension 50% of the total axial length.

3. The device according to claim 2, wherein the axial length of the first housing portion≤33% of the total axial length.

4. The device according to claim 1, wherein the device is an electric shaving device, and wherein the operative unit 44 is a shaving unit.

5. The device according to claim 1, wherein:
   the light guiding wall of the light guide is a tub-shaped wall;
   the light emitting surface extends along a first circumferential edge of the tub-shaped wall at a side of the tub-shaped wall facing the operative unit 44; and
   the light receiving surface extends along a second circumferential edge of the tub-shaped wall at a side of the tub-shaped wall remote from the operative unit.

6. The device according to claim 1, wherein the light indicator includes a plurality of light sources arranged, in the axial direction, in distributed positions adjacent to the light receiving surface.

7. The device according to claim 1, wherein the light guiding wall has at least two indentations extending from the light receiving surface in a direction towards the light emitting surface, said indentations forming interruptions of the light receiving surface dividing the light receiving surface into at least two light receiving surface portions.

8. The device according to claim 7, wherein the indentations each have two opposite side walls that gradually converge from the light receiving surface in the direction towards the light emitting surface.

9. The device according to claim 7, wherein the light indicator includes at least two light sources, wherein each light source is arranged, in the axial direction, in a position adjacent to a respective one of the at least two light receiving surface portions.

10. The device according to claim 1, wherein a drive train connected to the operative unit extends through said closed loop light emitting surface.

11. The device according to claim 1, wherein the at least one light source is arranged in a watertight chamber of the main housing, and wherein the light guide is arranged outside said watertight chamber and separated from the at least one light source and the watertight chamber by an optically transparent sealing member of the watertight chamber.

12. The device according to claim 11, wherein the sealing member has an optically transparent wall and wherein, during use, light generated by the light source is transmitted to the light receiving surface of the light guide via said optically transparent wall.

13. The device according to claim 12, wherein the light guide is arranged such that the light receiving surface is in direct contact with said optically transparent wall of the sealing member.

\* \* \* \* \*